United States Patent [19]
King

[11] 3,831,693
[45] Aug. 27, 1974

[54] STEERABLE ARTICULATION JOINT
[75] Inventor: James F. King, Cupertino, Calif.
[73] Assignee: Lockheed Missiles & Space Company, Inc., Sunnyvale, Calif.
[22] Filed: Dec. 26, 1972
[21] Appl. No.: 318,540

[52] U.S. Cl. ............ 180/14 A, 180/51, 180/79.2 B, 172/797, 280/479 R, 280/481, 280/492, 180/24.02
[51] Int. Cl. ............................................ B62d 59/00
[58] Field of Search ............ 180/14 R, 11, 12, 14 A, 180/51, 79.2 B, 24.02; 280/479, 481, 492; 172/797

[56] References Cited
UNITED STATES PATENTS

| | | | |
|---|---|---|---|
| 2,721,405 | 10/1955 | Gardner | 180/24.02 X |
| 2,936,037 | 5/1960 | Anderson | 180/14 R X |
| 3,442,345 | 5/1969 | Berger | 180/14 X |
| 3,450,213 | 6/1969 | Creighton et al. | 180/51 |
| 3,450,221 | 6/1969 | Nelson | 180/24.05 |
| 3,478,833 | 11/1969 | Breon | 180/14 R X |

*Primary Examiner*—Kenneth H. Betts
*Attorney, Agent, or Firm*—H. Donald Volk; Billy G. Corber

[57] ABSTRACT

A steerable articulation joint for effecting rapid connection of the two sections of a ground vehicle is shown. The joint has a first and second cylindrical support surface mounted concentrically from each other. The steerable articulation joint is connected to a steerable ground contacting member so that pivotable movement of the articulation joint causes concurrent movement of the ground contacting member in the opposite direction of rotation.

12 Claims, 4 Drawing Figures

PATENTED AUG 27 1974 3,831,693

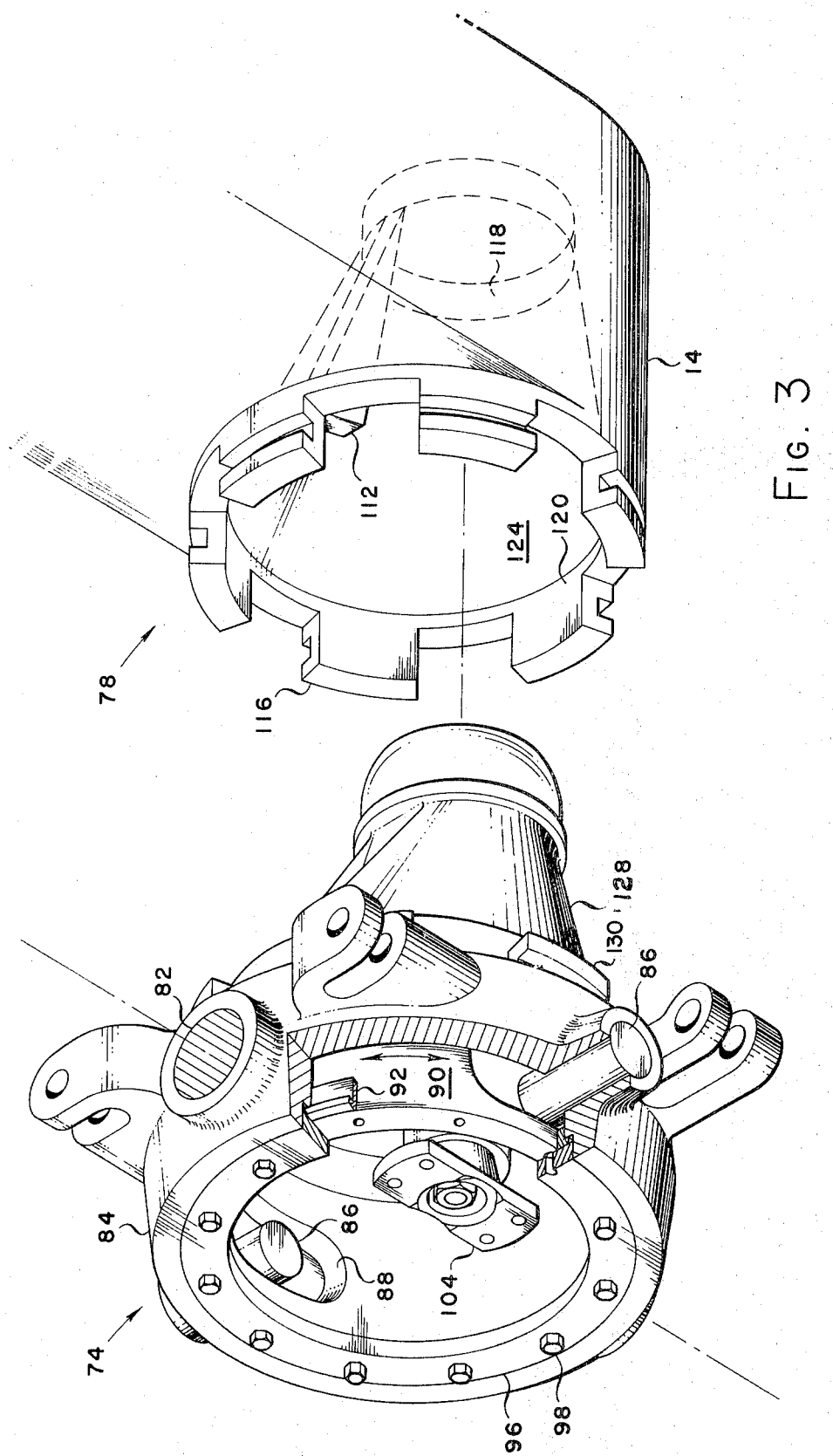

STEERABLE ARTICULATION JOINT

BACKGROUND OF THE INVENTION

This invention relates to a joint for connecting two sections of a ground vehicle for relative articulation and more particularly to such joint cooperating with a steerable ground contact member to effect steering, connecting and separating of the two sections as desired. The joint of this invention is particularly suitable for ground vehicles that include a first or power and control section and a second or load carrying or ground working section which are joined to one another for limited relative articulation by the joint structure. The first or power and control section normally includes, in addition to a prime mover, an operator's station and electrical and hydraulic control systems for controlling the vehicle including means for transmitting power to the second section. The second or load carrying or ground working section can take any desired form, such as a container for hauling material, a loader, a dozer, a scraper, a grader, etc. Because the first or power and control section includes a greater number of complex moving parts then the second member, the first section is more expensive to build and to maintain. Accordingly, a readily engageable and disengageable joint is provided by the present invention which enables two or more different load carrying or ground working sections to be interchangeable with a given power and control section. This readily attachable and detachable joint also expedites disconnection of the power and control section as may be needed to expedite maintenance.

Because the apparatus for joining the two sections affords articulation between the two sections, the wheels of both sections maintain contact with the ground at all times. This allows the articulated vehicle to maneuver and maintain traction on extremely rugged and irregular terrain. Relative movement between the two sections is afforded along a roll axis (a horizontal axis extending longitudinally of the vehicle) and a yaw axis (a vertical axis through the midpoint of the vehicle) but not in the pitch axis (a horizontal axis extending transversely of the vehicle). The present invention achieves the above advantages of articulated vehicles in a straightforward manner and permits the two sections to be readily attached to one another.

The present invention provides a readily engageable or disengageable articulation joint for joining the two sections. This is achieved by providing a socket affixed to one of the sections and an entering member affixed to the other section that telescopically enters and is received and retained within the socket by uncomplicated mechanisms. The connection between the entering member and the section to which is attached is adopted to allow the requisite movement with respect to the roll axis and the yaw axis.

The present invention also provides a joint between the two sections that can be rapidly engaged and disengaged on rough or irregular terrain without undue care of the operator of the vehicle. This is achieved by providing means for varying the height of the coupler from the ground along with means for varying the vertical displacement of the coupler on the drive vehicle. This allows the two sections to be engaged over a wide range of elevations and angles. For finally aligning the two members a socket member with a relatively large mouth is adapted to receive the entering member. Inward at the mouth, the socket tapers to a relatively small cross sectional shape. The entry member is tapered correspondingly with a non-uniform taper which includes an aligning guide. Thus, precise initial positioning of the two parts of the joint is unnecessary because the two parts telescopically align automatically as the two sections are moved toward one another. The guide on the socket member, in cooperation with the taper of the entry member, allows the two parts to telescope into alignment automatically as the two sections are moved towards one another so that when the entry member is fully received in the socket, the two parts are precisely aligned and ready for final encouplement.

The insertion member includes a first cylindrical surface and a second cylindrical mating surface concentric with said first surface. A tapered guideway is intermediate the first and second cylindrical surface. The socket member of the joint has corresponding first and second internal cylindrical surfaces. The socket member also includes an aligning guide which cooperates with the tapered socket of the insertion member to automatically complete the aligning of insertion member into the socket.

A power connection between the two sections is usually required so that all ground contact members can be powered. A power connection is also necessary to power equipment on the ground working section, such as scrapers and loaders. This is achieved in the present invention by providing, as a part of the joint, a drive shaft between the two sections of the coupler. This drive shaft is coupled by universal joints so as to avoid interference with articulation movement.

Since the two sections can be readily disengaged, it is desirable that the power control section be capable of normal movement when not coupled to the second section. This is provided in the present invention by providing means for locking the suspension system and steerable ground contacting members.

The foregoing, together with other objects, features and advantages of the present invention would be more apparent after referring to the following specification and accompanying drawings in which:

FIG. 3 is a perspective view of a joint according to the present invention in the disengaged positions;

Figure 1:
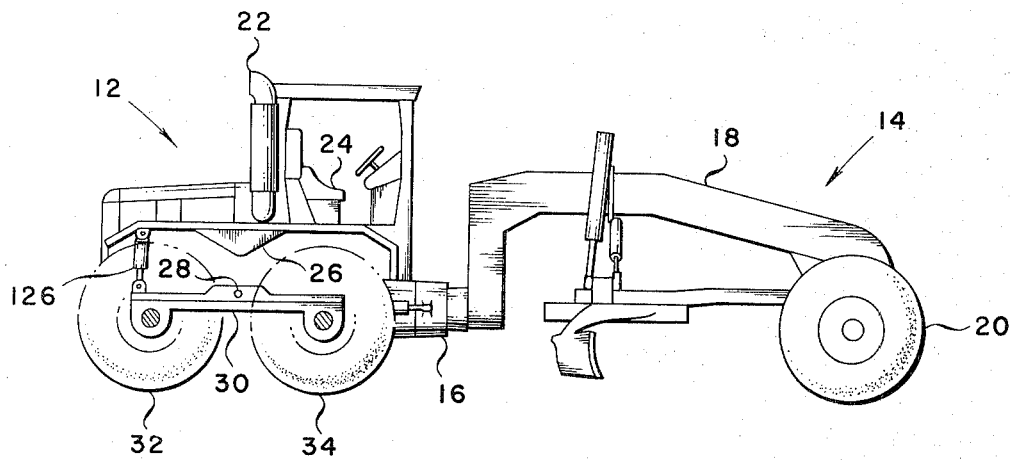
FIG. 1 is a partially schematic side elevation view of a vehicle employing an articulated joint of the present invention.

Referring more particularly to the drawings, reference numeral 12 indicates the first or power and control section of an articulated vehicle and 14 indicates a second or load carrying or ground working section which is joined to section 12 by an articulating joint 16. Vehicle section 14, in the example shown in FIG. 1, comprises a grader for grading dirt, rock or the like. Vehicle section 14 includes a frame 18. A pair of ground contacting members, such as wheel 20 are attached to frame 18 by a conventional vehicle suspension system. Through suitable drive trains, not shown, power is supplied to wheel 20 and its counterpart on the opposite side of the vehicle, and such power train is connected to the first or power control section 12 through articulating joint 16. The first or power control section of the vehicle includes a prime mover such as gasoline, diesel or turbine engine of conventional form which is supplied with conventional air intake and which exhaust combustion products through an exhaust system 22. The first section also includes an operator station 24 which is provided with appropriate steering and power controls. The suspension system for the first section includes a walking beam 30 at the forward end of which is mounted a wheel 32 and the rear end of which is mounted a wheel 34. Wheels 32 and 34 have their counterparts on the opposite side of the vehicle. The walking beam suspension system permits both wheels 32 and 34 to remain in ground contact at all times through suitable drive train which includes suspension system shaft 28. Suspension system shaft 28 is connected to the first section 12 through the longitudinal frame structure 26. Wheel 32 along with its counterpart on the opposite side of the vehicle are steerable.

Figure 2:
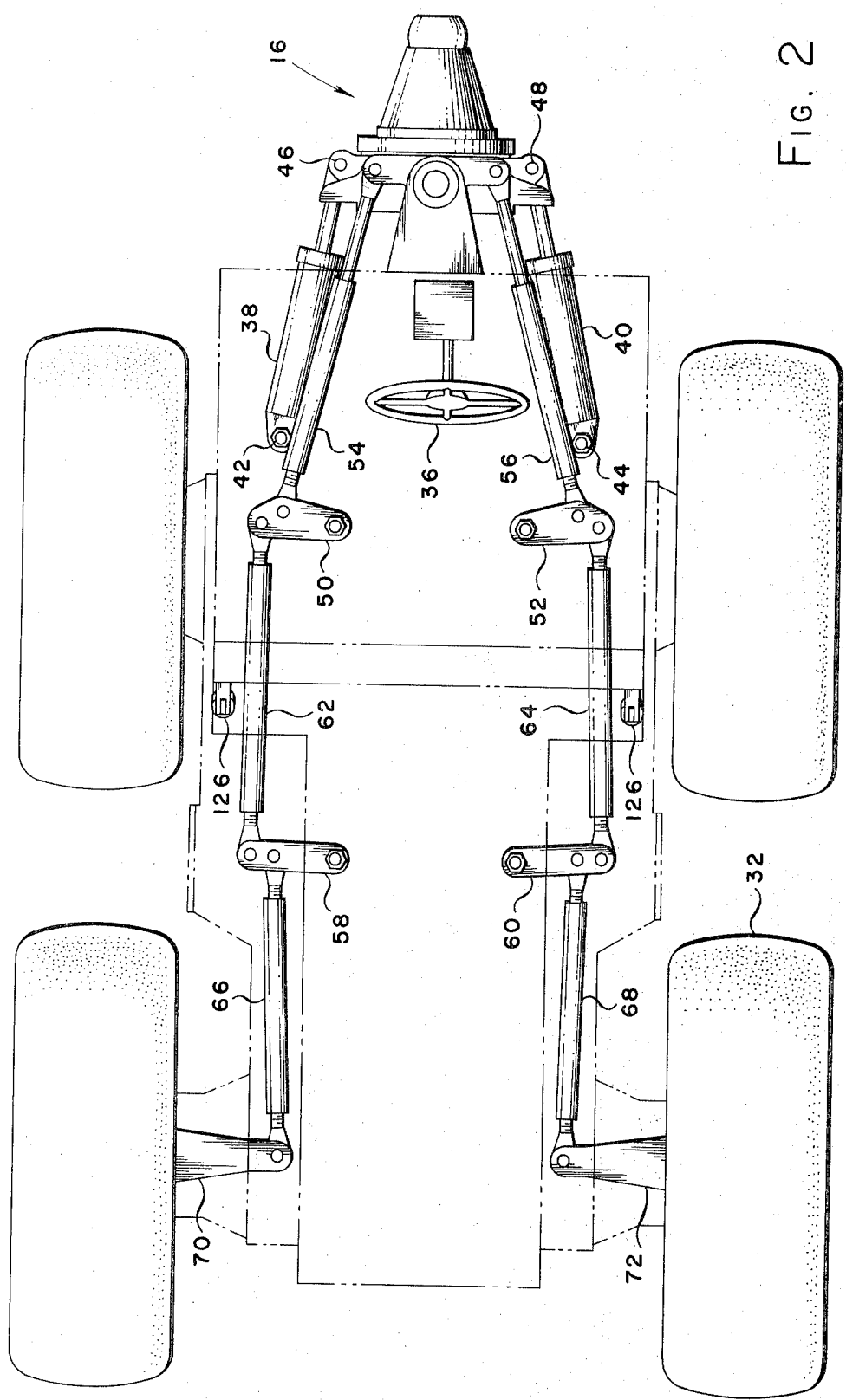
FIG. 2 is a partially schematic top elevation view of a power and control section of a vehicle showing the interrelationship of the articulated joint and the steerable ground contacting member.

With reference to FIG. 2, the steering wheel 36 is connected to a conventional hydraulic control system, not shown, which in turn is connected hydraulically to steering cylinders 38 and 40. The first end of steering cylinder 38 is pivotally attached to the frame structure 26 by pin 42. The first end of steering cylinder 40 is connected to frame structure 26 by pin 44. The other ends of steering cylinder 38 and 40 are attached to articulated joint 16. Articulated joint 16 is also connected to a first pair of bell cranks 50 and 52 through a pair of steering rods 54 and 56 respectively. The first pair of bell cranks 50 and 52 are in turn connected to a second pair of bell cranks 58 and 60 through connecting rods 62 and 64 respectively. The second pair of bell cranks 58 and 60 are connected to Pitman arm 70 and 72 through steering rod 66 and 68 respectively. Thus, as the steering cylinders are actuated to turn the articulated joint 16 in one direction, the linkages from articulated joint 16 in turn serve to turn wheel 32 concurrently but in the opposite direction of rotation.

A pair of hydraulic cylinders 126 are attached to the frame structure 26 and the walking beam 30. When the first or power and control section 12 is operated alone, hydraulic cylinders 126 lock the frame 26 relative to the walking beam 30 for maintaining the desired angular relationship between walking beam 30 and the frame 26. Hydraulic cylinder 126 is adjustable so that the angular relationship between walking beam 30 and frame structure 26 can be adjusted thereby varying the height of the articulated joint 16 relative to the ground.

Figure 4:
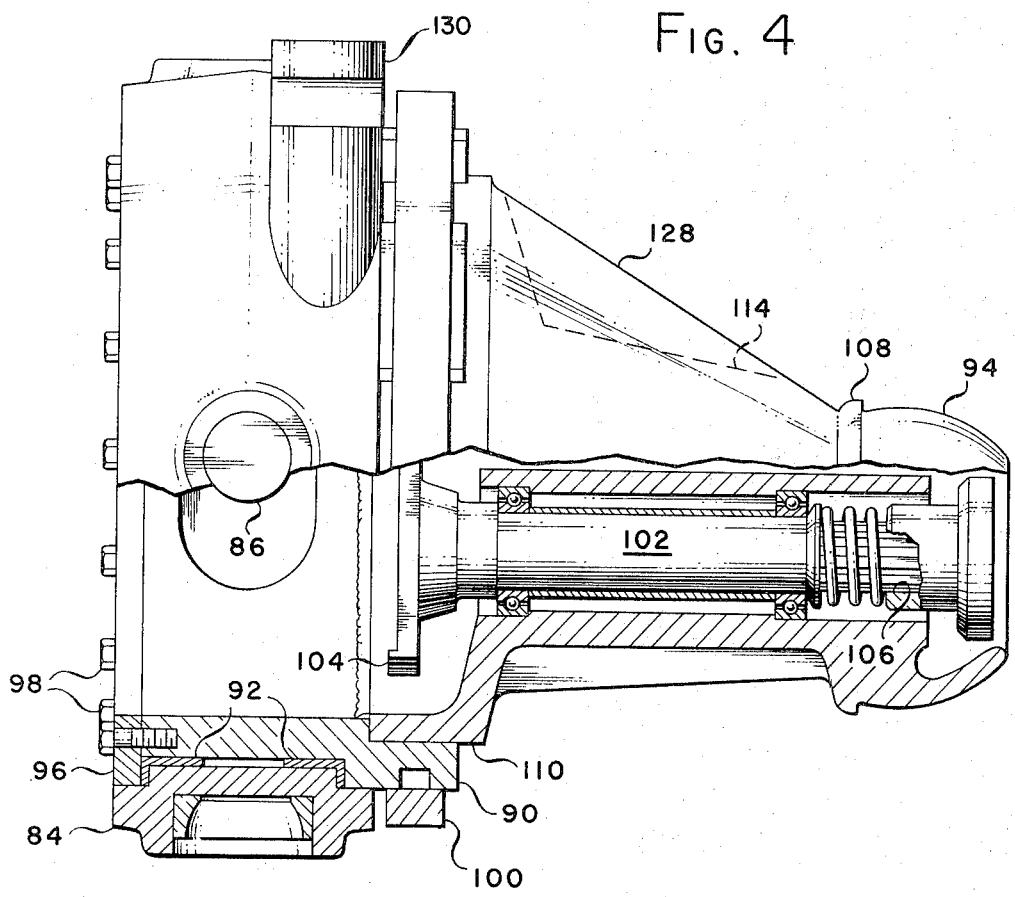
FIG. 4 is a side elevation view of the joint of the present invention in a disengaged position, portions being broken away to reveal internal details.

With reference to FIG. 3 and 4, the outer housing 84 of the insertion member 74 is pivotably attached to the first or power control section 12 by yaw pin 82. A roll limit pin 86 is rigidly attached to the outer housing 84 and projects inwardly therefrom. Inner housing 90 is rollably mounted by roll bushing 92 on the interior of outer housing 84. Roll limit pin 86 projects into elongated guide 88 defined by the inner housing 90. Backing plate 96 is attached to the other end of inner housing 90 by an annular ring of bolts 98. Lockring 100 is rotably mounted on the outer periphery of inner housing 90. A drive shaft 102 which includes a flange 104 is mounted in inner housing 90. Drive shaft 102 includes a male spline 106. A first cylindrical support surface 108 is machined or otherwise formed on the outer extremity of guideway 94. External cylindrical support surface 108 is concentric with drive shaft 102. The second external cylindrical support surface 110 is formed on the outer periphery of guideway 94 adjacent to inner housing 90. The second external cylindrical support surface 110 is machined or otherwise made parallel to and concentric with the first external cylindrical support surface 108.

Socket member 78 of articulated joint 16 is rigidly affixed to the second load carrying or ground working section 14 of the ground vehicle. Projecting within socket member 78 is guide 112 which cooperates with guide receptical 114 for aligning the insertion member 74 and the socket member 78. A lockring flange 116 is machined on the outer extremity of socket member 78. Internal of socket member 78 are first internal cylindrical support surface 118 and second internal cylindrical support surface 120 that corresponds to and cooperates with the first and second external cylindrical support surfaces on insertion member 74.

To explain the operation of the present invention, it will be assumed that the control section 12 and the load carrying or ground working section 14 are disconnected from one another and locking ring 100 is set in the unlocked position so as to not interfere with the coupling. In this disengaged position the mouth 124 of socket number 78 presents a broad, unobstructed opening for receipt of relatively narrow end of insertion member 74. Power and control section 112 is then backed slowly towards load carrying or ground working section 14. Hydraulic cylinders 126 can be adjusted to change the pitch of the power and control section 12 to bring the insertion member 74 into approximate vertical alignment with socket member 78. Slight misalignment in the vertical direction is compensated for by the snout portion 128 of insertion member 74. The operator can adjust the horizontal position of insertion member 74 by turning steering wheel 36. As backing movement of power and control section 12 proceeds, guide 112 of socket member 78 eventually contacts one or the other side faces of guide receptical 114. Because of the tapered configuration of the walls of guide receptical 114, contact and further rearward movement of the insertion 74 brings the insertion member into approximate alignment with socket member 78. As the mating nears completion the first external cylindrical support surface 108 and the compliment first internal cylindrical support surface 118 on the walls of socket member 78 and the second external cylindrical support surface 110 and its complimental second internal cylindrical surface 120 in socket member 78 bring the insertion member into proper vertical alignment within socket member 78. At the same time, guide 112 rides within guide receptical 114 so that locking ring flange 116 and locking ring flange 130 mesh. Thus, the guide and the guide receptical afford a fine or precise final alignment between the members so that when the members are fully aligned, lock ring 100 can be twisted, and the engagement of the joint is complete. Drive shaft 102 is automatically connected to the drive shaft in the second or load carrying or ground working section 14 through male spline 106.

It would be appreciated that when the joint is connected as has been described in the proceeding paragraph, innerhousing 90 and guideway 94 are rigidly attached to socket member 78 and this assembly, as a unit, is free to rotate in the roll direction relative to the outer housing 84 within the limits described by roll guide 88.

In order to disconnect power and control section 12 from load carrying or ground working section 14 to use the former section with another working section, it is only necessary to adjust the pitch of the vehicle 12 by use of the hydraulic cylinders 126 and adjust the steering wheel 34 to remove pressure on locking ring 100. Locking ring 100 can then be twisted and power and control section 12 driven away under its own power. Hydraulic cylinders 126 during this independent movement of the power and control section 112 will lock the walking beam 30 so that it cannot walk relative to the power and control section 112.

From the above, it can readily be seen that the present invention provides a fast acting, simple and rugged apparatus for joining the sections of a ground vehicle and also provides alignment between the two vehicle sections. The joint is also adapted for cooperation with a steerable wheel on a walking beam which facilitates the movement of the power section without attachment to the load carrying or ground working section.

While the articulated joint described herein is presently considered to be preferred, it is contemplated that numerous various other variations and modifications within the purview of those skilled in the art can be made therein. The following claims are intended to cover all such variations and modifications as fall within the true spirit and scope of the invention.

I claim:

1. In an articulated vehicle comprising
   first and second sections,
   separable intervehicle coupler between said first and second sections, said separable intervehicle coupler comprising an insertion member and a socket member,
   said first section including a pair of walking beams defining a suspension system and a frame section, said walking beams pivotly mounted for vertical movement between said suspension system and said frame,
   first power actuated means between said suspension system and said frame to adjust and lock the vertical angular relationship between said beam and said frame and thereby vary the vertical position of said coupler,
   said insertion member pivoted to said frame for relative yaw movement,
   second power actuated means between said insertion member and said frame to adjust and lock the horizontal angular relationship between said intervehicle coupler and said frame,
   and selectable control means operably connected to said first and second power actuated means for alignment of said insertion member and said socket member for joining the first and second sections of the articulated vehicle.

2. In an articulated vehicle according to claim 1 including a driveshaft through said intervehicle coupler for transmission of power to said second section.

3. In an articulated vehicle according to claim 1 wherein said insertion member defines a first and second cylindrical support surface and a tapered portion between said first and second cylindrical support surfaces, said tapered portion cooperating with said socket member to assist in aligning said intervehicle coupler, and said first and second cylindrical support surfaces assisting in maintaining said insertion member and said socket member in alignment.

4. In an articulated vehicle according to claim 1 wherein said socket member includes a guide means and said insertion member includes a guide receptical, said guide means and guide receptical cooperating to align said intervehicle coupler.

5. In an articulated vehicle according to claim 4 wherein said insertion member defines a first and second cylindrical support surface and a tapered portion between said first and second cylindrical support surfaces, said tapered portion cooperating with said socket member to assist in aligning said intervehicle coupler, and said first and second cylindrical support surfaces assisting in maintaining said insertion member and said socket member in alignment.

6. In an articulated vehicle according to claim 5 including a driveshaft through said intervehicle coupler for transmission of power to said second section.

7. In an articulated vehicle according to claim 6 wherein each walking beam includes at least one steerable ground contacting member thereon,
   steering means connecting said intervehicle coupler to said steerable ground contacting member for pivotal movement of said intervehicle coupler concurrently with but in the opposite direction than said steerable ground contacting members.

8. In an articulated vehicle according to claim 1 wherein said intervehicle coupler includes a roll means to allow relative angular rotation between said first and second sections.

9. In an articulated vehicle according to claim 8 wherein each walking beam includes at least one steerable ground contacting member thereon,
   steering means connecting said intervehicle coupler to said steerable ground contacting member for pivotal movement of said intervehicle coupler concurrently with but in the opposite direction than said steerable ground contacting members.

10. In an articulated vehicle according to claim 9 including a driveshaft through said intervehicle coupler for transmission of power to said second section.

11. In an articulated vehicle according to claim 10 wherein said socket member includes a guide means and said insertion member includes a guide receptical, said guide means and guide receptical cooperating to align said intervehicle coupler.

12. In an articulated vehicle according to claim 11 wherein said insertion member is further defined as including a first and second cylindrical support surface and a tapered portion between said first and second cylindrical support surfaces, said tapered portion cooperating with said socket member to assist in aligning said intervehicle coupler, and said first and second cylindrical support surfaces assisting in maintaining said insertion member and said socket member in alignment.

* * * * *